United States Patent [19]

Baus

[11] Patent Number: 4,600,330
[45] Date of Patent: Jul. 15, 1986

[54] FRAME, MORE PARTICULARLY FOR A SHOWER PARTITION

[76] Inventor: Heinz G. Baus, 35, Wartbodenstrasse, CH-3626 Hünibach/Thun, Switzerland

[21] Appl. No.: 559,822

[22] Filed: Dec. 9, 1983

[30] Foreign Application Priority Data

Dec. 9, 1982 [DE] Fed. Rep. of Germany ....... 3245573

[51] Int. Cl.⁴ .............................................. F16B 11/00
[52] U.S. Cl. ...................................... 403/23; 403/286; 403/403; 52/311
[58] Field of Search ................. 403/23, 401, 402, 403, 403/286; 52/311, 312, 656

[56] References Cited

U.S. PATENT DOCUMENTS

| 3,667,177 | 6/1972 | Biela | 52/461 X |
| 3,728,833 | 4/1973 | Grossman | 52/311 |
| 3,927,500 | 12/1975 | Plumlee | 52/281 X |

FOREIGN PATENT DOCUMENTS 891820 1/1982 Belgium .
8013940 7/1981 Fed. Rep. of Germany .
3117046 11/1982 Fed. Rep. of Germany .
445749 2/1968 Switzerland .

Primary Examiner—Andrew V. Kundrat
Attorney, Agent, or Firm—Schwartz, Jeffery, Schwaab, Mack, Blumenthal & Evans

[57] ABSTRACT

The invention relates to a frame, more particularly for a shower partition, the said frame comprising at least two shaped or profiled rails preferably connected together at a right angle. In the case of a frame of this kind, problems arise in the corner area in that the surfaces of the profiled rail, shaping element, covering profile, or the like in that area must be carried over into each other. Moreover, as a result of assembly inaccuracies, when a frame of this kind is assembled, gaps arise into which dirt can penetrate and which are also constructionally undesirable. It is therefore proposed, according to the invention, that a facing element (16) be arranged in the connecting area between the profiled rails (2, 4) on the outside of the frame, the said facing element comprising at least one spring locking means (36, 58). This spring locking means engages and/or catches in an opening (30, 36) in the profiled rail (4), thus ensuring an easily produced but functionally reliable attachment of the said facing element (16) to the profiled rail (4).

23 Claims, 6 Drawing Figures

FRAME, MORE PARTICULARLY FOR A SHOWER PARTITION

The invention relates to a frame, more particularly for a shower partition, the frame having at least two profiled or shaped rails preferably connected together at a right angle.

It is known to connect shaped rails together by means of corner-pieces, thus obtaining a rectangular frame, for example. However, such corner-pieces are additional components involving not inconsiderable production costs. Moreover, two shaped rails can also be connected together directly, in which case the rails are usually mitred and then united with each other. This requires particular care since a gaping joint will allow dirt and contamination to enter the frame. In the case of frames for shower partitions, it is often necessary to cut the shaped rails to length on the job in order to adapt the frame to structural conditions. It is obvious that, under these circumstances, it is difficult to achieve great dimensional and angular accuracy, and undesirable gaps between the rails are scarcely to be avoided. This not only affects the visual appearance of the frame, but also allows dirt and contaminants to enter, thus making it impossible for such partitions to meet hygienic requirements. In addition to this, in the case of frames, especially shower partitions, so-called facing panels are often fitted to the surface of the frame, visible to an outside observer. In this case, difficulties arise in connection with the design of the corners of the facing panel and of the joints between the shaped rails.

It is therefore an object of the invention to form the connecting area between the shaped rails of a frame in such a manner that the two rails can be united simply and inexpensively. Any gaps or the like between the profiled rails, on the side of the frame visible to an observer, are to be bridged in a simple manner. Furthermore, the shape of one rail is to be harmoniously adaptable to that of the other rail and of the facing panel. In order to achieve economical installation, production and assembly expenses should be kept low, and it should be possible for the necessary fitting-work to be carried out by unskilled labor, without special tools, and at the job site. The frame is furthermore to be functionally reliable and to meet operational conditions and requirements.

According to the invention, this purpose is achieved in that a facing element comprising at least one spring locking means is arranged in the joint area between two shaped rails on the outside of the frame and in that one of the rails comprises an opening or recess in which the said spring locking means engages or catches. The proposed facing element provides a simple and expedient means for the adaptation of, and transition between, one shaped rail and the other. There is no difficulty in constructing the facing element to match the surface-structure or surface-configuration of the shaped rails in order to achieve, simply and without unwanted side effects, a harmonious transition from one rail to the other. This applies above all in the case of shaped rails having facing panels inserted into their surfaces which, by appropriate configuration of the said facing element, can be merged into each other as if it were seamlessly, even in the case of right-angled joints between the shaped rails. Moreover, in assembling the frame on the job, the facing element fitted at the joint allows any necessary adaptation. It is furthermore of particular importance that any gaps between the profiled rails be covered and penetration of dirt and foreign bodies into the frame be largely eliminated. What takes place is compensation for tolerances as it were, since the facing element is also a simple and expedient way of covering even sloping and ragged cut-surfaces on the united shaped rails. The facing element is merely snapped, with its spring locking means, into the appropriate opening or recess in a shaped rail, thus eliminating costly assembly procedures and special tools. The facing element may be produced inexpensively, it being a simple matter to design the said spring locking means to the requirements of the situation.

In one particularly practical embodiment, the back of the facing element comprises at least one guide surface, with which is associated the locating surface of the one shaped rail. This is a particularly simple way of ensuring exact alignment of the said facing element with the said shaped rail.

In another practical embodiment, the facing element comprises a central part engaging in a longitudinal groove in one shaped rail. This central part imparts to the facing element considerable stability, allowing it to be made relatively thin in other areas, if necessary, without detriment to its reliable attachment. If the profiled rail already comprises an adequate, known longitudinal groove, the central portion thereof, provided in accordance with the invention, is simply arranged therein, thus ensuring reliable locking and guiding of the said blending element.

In one advantageous embodiment, the locating surface for the shaped rail is arranged on one lateral wall of the longitudinal groove, in which case the guide surface of the facing element preferably extends over the total length thereof.

Reliable alignment and locking of the facing element is thus achieved in a particularly simple manner.

In one particularly practical configuration, the facing element comprises a projection engaging in an undercut recess in the vicinity of the lateral wall of the longitudinal groove in the shaped rail. This particularly simple construction, achieved at low cost, ensures reliable seating of the facing element in the shaped rail. The spring locking means provided in accordance with the invention, together with the proposed projection, engages in the recesses provided for the purpose in the shaped rail, and it will be seen that this produces a particularly expedient distribution of force.

In one preferred configuration the base, arranged in a reinforced central part of the facing element, lies upon the bottom of the longitudinal groove in the shaped rail. This prevents any damage to the said facing element upon being inserted, or snapped, into the rail, since the said bottom constitutes a stop and any bending, or even breaking, of the facing element is thus prevented, even with large forces.

In one particularly practical configuration, a predetermined width of a lateral part of the facing element projects beyond the front edges of the associated other shaped rail. In a particularly simple manner, any gap between the united profiled rails is thus bridged by the said lateral part. This makes it possible to take into account any inaccuracy in cutting the shaped rail to length, without this being visible in the finished frame.

It is desirable for the said lateral part to be relatively thin, preferably between 1 and 4 mm, more particularly between 1.5 and 3 mm in thickness. This allows the said lateral part to project easily beyond the relevant shaped rail, with no detrimental effect upon the configuration of the frame.

In one practical configuration, a predetermined length L of the end part of the facing element projects beyond the front surface of the facing panel. Any inaccuracies in, or damage to, the front face of the facing panel may thus be covered in a simple manner.

In another configuration, the one shaped rail comprises an opening, preferably in the form of hole, into which a stud on the facing element, extending substantially at right angles to the longitudinal axis of the shaped rail, projects. This is a simple way of fixing the longitudinal position of the facing element.

In one practical configuration, the above-mentioned stud is equipped with at least one spring locking finger. The stud and locking finger thus form a unit which is a particularly low-cost production item.

In one practical configuration, the facing element comprises at least one lever extending in the direction of the longitudinal axis of the shaped rail, the end of the said lever carrying a locking finger engaging in the lateral recess in the shaped rail and/or in the longitudinal groove therein. The lever makes possible a relatively long spring travel for the locking finger, as a result of which the facing element is particularly easily inserted or snapped into the shaped rail.

In a further embodiment, the facing element comprises a tongue spaced from its rear side, at the end of which is provided a stud engaging in the opening. The tongue and stud thus constitute the locking means proposed according to the invention, which is now adapted to move approximately perpendicularly to the bottom surface of the shaped rail, because of the distance from the rear side of the facing element. This construction makes it very easy to remove the facing element again, since the stud merely has to be pushed, from the rear side of the shaped rail, out of the opening, in order to allow the facing element to be removed from the rail and/or from the longitudinal groove therein.

In an alternative embodiment, the facing element comprises, on its rear side, at least one outwardly curved web, a recess being provided in the said web in such a manner that a part thereof, spaced from the rear side, constitutes the spring locking means. The said recess, in the form of a slot or the like, can easily be arranged during compression-moulding in the web provided on the rear side of the facing element. Thus a web, preferably extending over the entire length, is provided on the rear side of the facing element, the said web, because of the recess provided in accordance with the invention, also forming the spring locking means. As a result of the outward curvature, the spaced part of the web, and the spring locking means thus formed, engages, after insertion into the shaped rail, in the recess therein already described in detail hereinbefore. In principle, only a single web may be provided, the arrangement and construction thereof being governed by the relevant recess in the shaped rail. It will be seen, however, that it is desirable to provide two such webs with locking means springing outwardly, especially since, in this case, each locking means need be designed for only half of the necessary spring travel. The spring locking means is preferably located centrally and also extends over about half the length of the facing element. This provides a favorable compromise between strength and spring capacity. In order to facilitate insertion of the facing element into the profiled rail, the outer surface of the spaced part of the web, and thus of the locking means, is preferably chamfered or rounded off.

Further inventive features can be seen from the following explanations of working examples, wherein.

Figure 1:
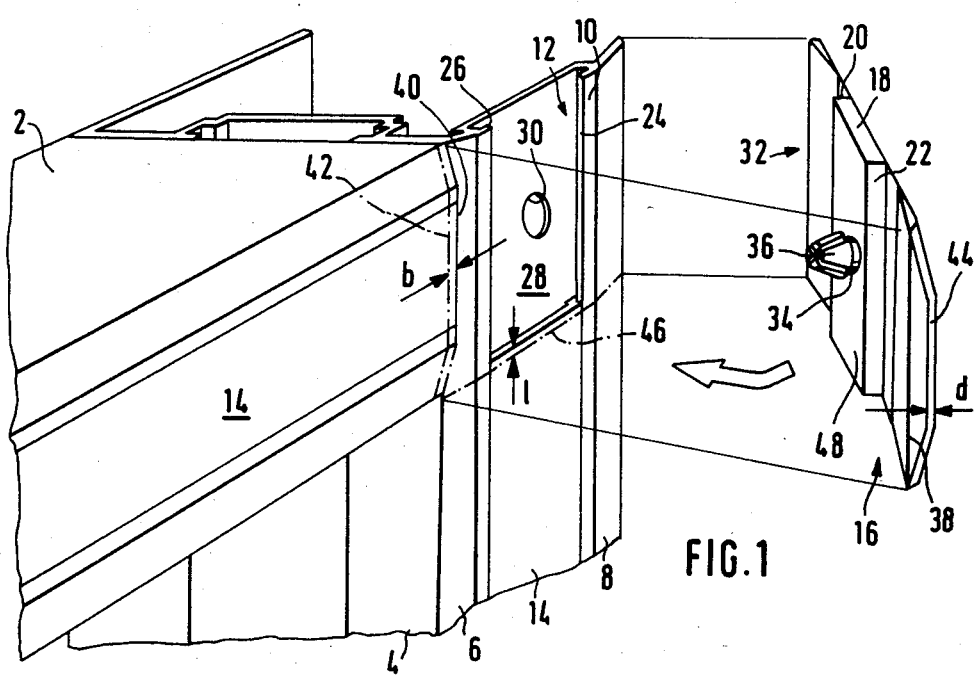
FIG. 1 shows a perspective view of the joint area in a frame comprising two shaped rails joined together at a right angle, in which a facing element with a stud is engaged in a recess of one shaped rail.

FIG. 1 illustrates a joint area of two shaped rails 2, 4 which are connected together in a manner not shown here in further detail. It should be noted that the shaped rail 2 may be provided with well-known channels or the like for screws, in order to achieve a firm joint between the two rails. The frame may consist of a total of four such shaped rails disposed at right angles to each other but, for the sake of simplicity, here only the upper right-hand corner of the frame is shown. In the case of a shower partition, the rail 2 comprises well-known guide rails, not shown, from which doors, adapted to slide in the direction of the longitudinal axis of the shaped rail 2, are suspended. Like rail 2, rail 4 has lateral faces 6, 8 which are inclined at a predetermined angle relative to the front face 10 of the shaped rail 4. The rail 4, and the same applies to the rail 2, comprises a central longitudinal groove 12 in which is arranged a facing panel 14. The facing panel 14 is shorter than the rail 4, so that the longitudinal groove 12 is free in the joint area. Also provided is a facing element 16 having a reinforced central part 18 mounted in the longitudinal groove 12. For the sake of clarity, and in order to provide a better explanation, the facing element is shown removed from the rail 4.

The facing element comprises two lateral guiding surfaces 20, 22 which bear against lateral confining faces 24, 26 of the rail 4 and/or of the longitudinal groove 12. It will be seen that this ensures satisfactory alignment between the facing element 16 and the longitudinal axis of the rail 4. Provided through the bottom 28 of the longitudinal groove 12 is an opening 30 which may simply be a bore hole. The back 32 of the facing element 16 has a stud 34 which correspondingly engages in the opening 30. This stud 34 is provided with four locking spring fingers 36 which, after the facing element is inserted into the rail 4, spring out in the hole and thus prevent the facing element 16 from falling out. The facing element 16 may, however, be quite easily removed by compressing the four locking fingers 36. The lateral part 38 associated with rail 2 has a relatively small thickness d, and projects, by a predetermined width b beyond the front edge 40 of the rail 2.

Dotted line 42 in the drawing indicate the position of the longitudinal edge 44 of the facing element 16. The thickness d amounts to about 2 mm, so that the projecting longitudinal edge 44 is scarcely visible. As furthermore indicated by the dotted line 46, the lower end 48 of the facing element 16 projects beyond the face 50 of the facing panel 14. This is a simple way of achieving a symmetrical configuration of the joint area, since both end part 48 and lateral part 38 project correspondingly. It will be seen that any gaps or ragged edges at the ends of both the facing panel 14 and the shaped rail 2 are thus covered by the facing element 32 and it is therefore unnecessary to maintain any special tolerances when the aforementioned parts are cut to size.

As indicated by line 46, the lower end part 48 projects beyond the face 50 by a predetermined length 1.

Figure 2:
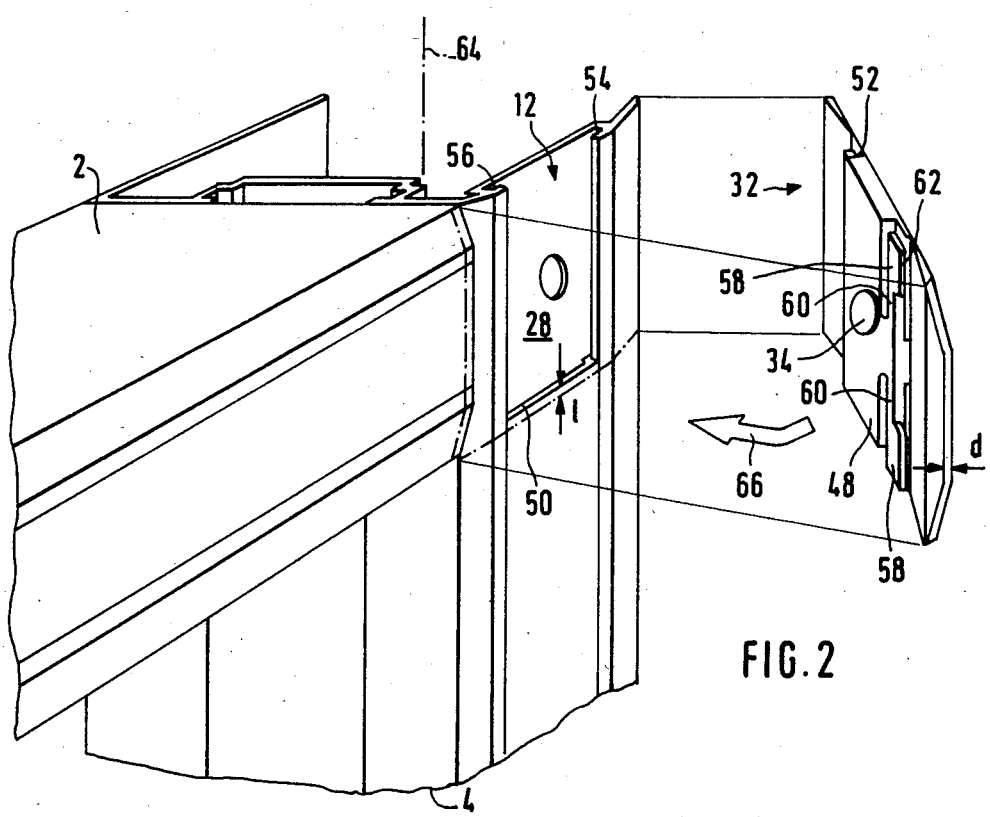
FIG. 2 shows an alternative embodiment in which the facing element comprises two locking fingers formed on levers.

FIG. 2 illustrates an alternative embodiment in which a substantially cylindrical stud 34 is provided on the rear side 32 of the facing element 16. The central part 18 of the facing element 16 comprises a lateral projection 52 extending longitudinally and engaging in an undercut recess 54 in the profiled rail. Facing this is a further recess 56 in the profiled rail 4 and two locking fingers 58 engage in this recess 56, the locking fingers 58 being provided at the ends of levers 60 of the facing element 16. This construction provides the resilient locking fingers 58 with a relatively large spring deflection thereby making it particularly easy to insert the facing element 16 into the rails and/or longitudinal groove 12 thereof. The locking fingers 58 are preferably provided with rounded-off edges 62, in order to ensure simple insertion and snapping-in. The stud 34, which in this case is cylindrical and engages in opening 30 through the bottom 28 of the longitudinal groove 12, ensures that the facing element 16 is properly located in relation to the longitudinal axis 64 of the shaped rail 4. The facing element 16 is inserted into the longitudinal groove 12 by moving it along the direction of arrow 66, the lateral projection 52 being first inserted into the undercut recess. It will be seen that, thereafter, pressure applied on the facing element 16 initially causes the resilient locking fingers 58 to move back and then to snap into the recess 56.

Figure 3:
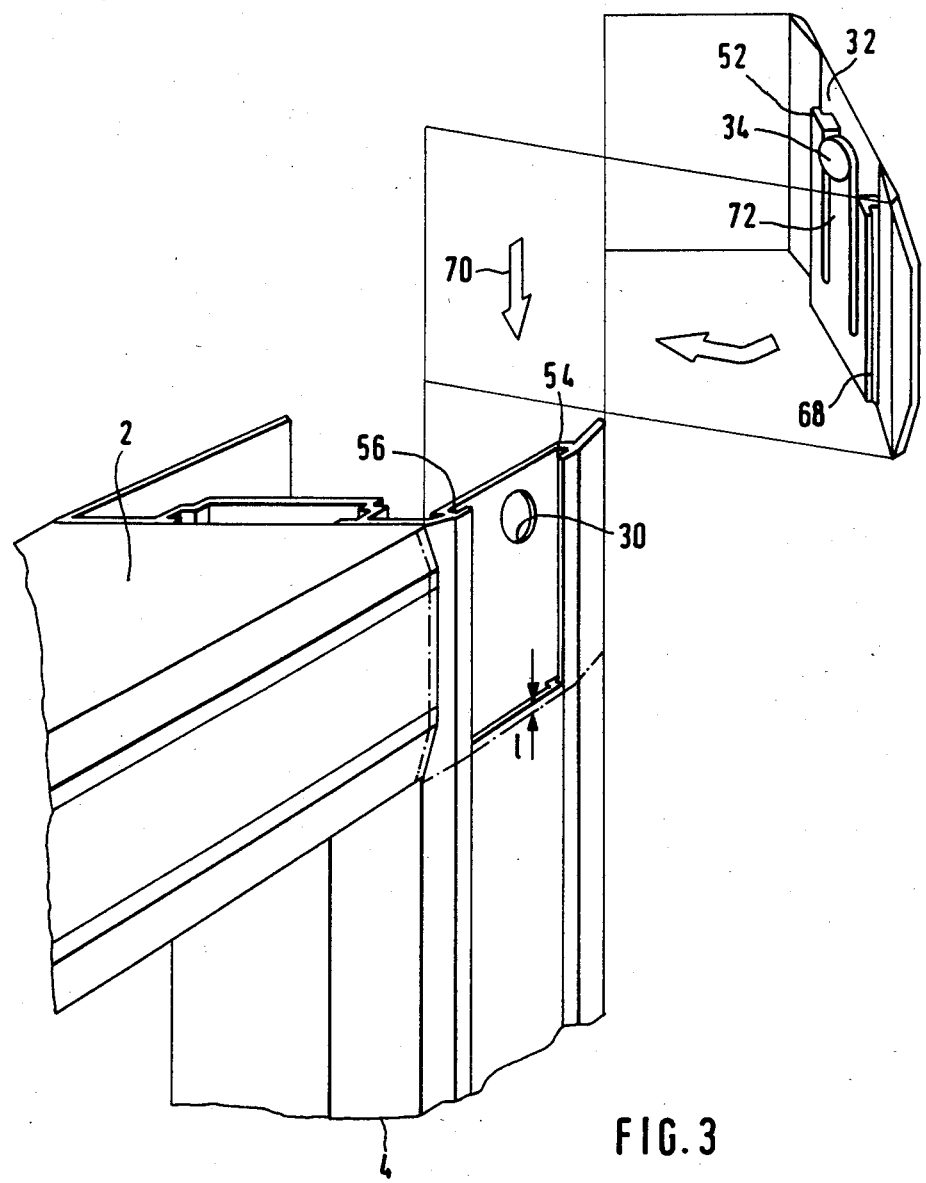
FIG. 3 shows an embodiment in which a resilient tongue with a stud is provided on the rear side of the facing element as a locking means.

In the embodiment of FIG. 3, the facing element 16 comprises two lateral projections 52, 68 engaging respectively in the undercut recesses 54, 56 in the profiled rail. In this case, the facing element 16 must be inserted into the rail 4 in the direction of arrow 70. On the rear side of the said facing element, there is a resilient tongue 72, the end of which is formed with a stud 34. This resilient tongue 52 is spaced a certain distance from the rear side of the facing element 16 so that, upon insertion into the profiled rail, the resilient tongue can be pushed back accordingly. When the facing element 16 is fully inserted into profiled rail 4, then the stud 34 enters into the relevant opening 30 of the profiled rail. The facing element may be removed again at any time merely by pressing the stud 34, from behind, out of the opening 30, after which the facing element 16 can be slid up out of the shaped rail 4 in a direction reverse that of arrow 70.

Figure 4:
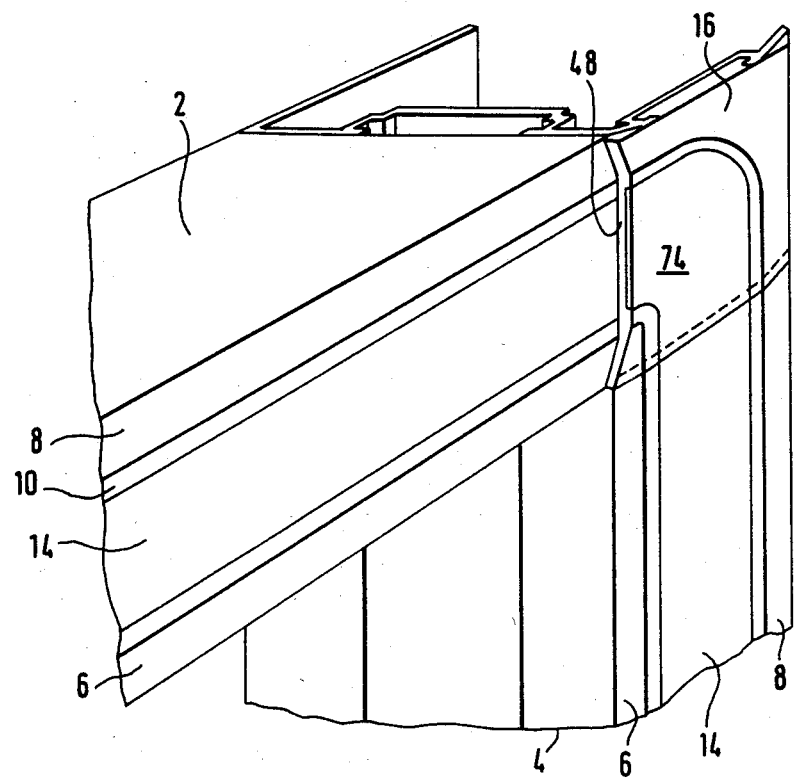
FIG. 4 shows the corner area of a frame with the facing element inserted.

FIG. 4 illustrates the frame with the facing element 16 already installed in position. It will be seen that the profiled rails 2, 4 comprise lateral surfaces 6, 8 which are disposed at an angle with respect to the front face 10. In the vicinity of the lateral part 48 and end part 58, the facing element 16 is formed in such a manner as to bear directly upon the inclined lateral surfaces 6, 8. This ensures particularly practical and favorable adaptation of the facing element 16 to the shaped rails. There is no need to emphasize that, even with other types of shaped rail surfaces, the necessary adaption is easily obtained with the facing element according to the invention. According to the invention, the facing element 16 may further comprise a decorative element 74 corresponding in color and configuration with the facing panels 14 of the two rails 2, 4. If, for example, the facing panels 14 are made of wood, then the desired adaptation can be achieved without difficulty by means of a thin decorative element, for example in the form of a piece of foil or wood-veneer.

Figure 5:
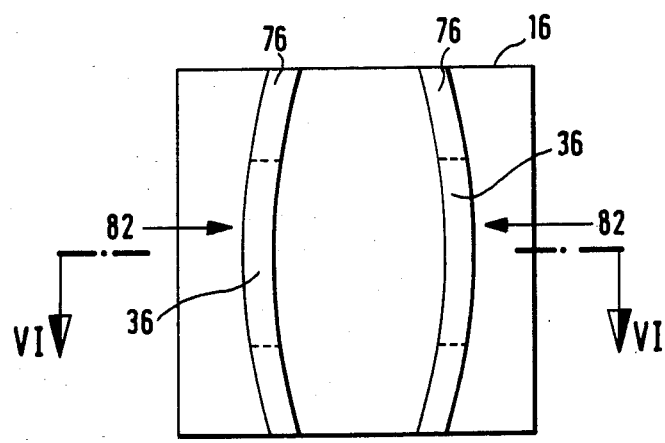
FIG. 5 is an elevation view of the rear of an alternative embodiment of the facing element.
Figure 6:
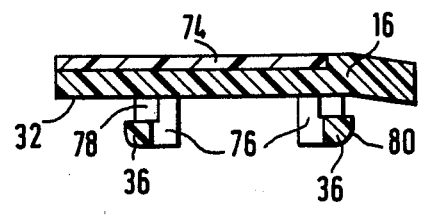
FIG. 6 is a cross section along the line VI—VI in FIG. 5.

FIG. 5 shows another embodiment of the facing element 16, as viewed from the rear side 32. The element 16 has two outwardly curved ribs 76, the greatest distance between them being at the center. FIG. 6, which is a cross section along the line VI—VI, shows recesses 78 in each of the said ribs. By reason of these recesses 78, the parts of the rib spaced from the rear side 32 form spring locking means 36 which can be forced inwardly in the direction of arrows 82. The recesses 78 are arranged substantially centrally and cover approximately half the length of the facing element 16. It may be pointed out at this point that, in this case the facing element 16 is made of a suitable elastically resilient material, for the purpose of providing the above-mentioned spring action. Outer surfaces 90 of the spring locking means 36 are chamfered or rounded off which substantially facilitates their insertion into the relevant shaped rail. As a result of the outwardly directed curvature, provided according to the invention, after insertion into a shaped rail, the spring locking means 36 engage in the relevant recesses thus ensuring firm and reliable seating. Decorative element 74, provided on the front face, is also visible in FIG. 6.

| List of reference numerals | |
|---|---|
| 2, 4 | profiled rails |
| 6, 8 | lateral surfaces |
| 10 | front surface |
| 12 | longitudinal groove |
| 14 | facing panel |
| 16 | facing element |
| 18 | central part |
| 20, 22 | guide-surface |
| 24, 26 | locating face |
| 28 | bottom surface |
| 30 | opening |
| 32 | rear side |
| 34 | stud |
| 36 | locking finger |
| 38 | lateral part |
| 40 | front edge |
| 42 | broken line |
| 44 | longitudinal edge |
| 46 | broken line |
| 48 | end part |
| 50 | front surface |
| 52 | lateral projection |
| 54, 56 | opening |
| 58 | locking means |
| 60 | lever |
| 62 | edge |
| 64 | longitudinal axis |
| 66 | arrow |
| 68 | lateral projection |
| 70 | arrow |
| 72 | tongue |
| 74 | decorative element |
| 76 | rib |
| 78 | opening in 76 |
| 80 | outer surface |
| 82 | arrow |

I claim:

1. A frame suitable for a shower partition having a facing side and being formed of at least two rails angularly connected together at a joint area formed by butting an end of one rail against a side of another rail and connecting the rails to each other, said frame further comprising a generally flat facing element having a facing side and further having locking means on the side thereof opposite said facing side; means defining a groove on one of said rails in said joint area and on said facing side of said frame, in which groove said facing element is removably received with the facing side thereof essentially parallel with the facing side of said frame, and recess means in said joint area cooperating with said locking means to lock said facing element removably in said groove, said facing element having a size sufficient to cover said joint area fully.

2. A frame as claimed in claim 1, characterized in that said groove extends in the direction of the longitudinal axis of said one of said rails and has side flanges that define opposed lateral confining faces parallel to said longitudinal axis, and in that said facing element has a pair of parallel guide surfaces bearing against said confining faces.

3. A frame as claimed in claim 2, characterized in that said guide surfaces are the side edges of a central part of said facing element.

4. A frame as claimed in claim 3, characterized in that the length of said confining faces of said groove and the length of said side edges of said central part are substantially equal.

5. A frame suitable for a shower partition having a facing side and being formed of at least two rails angularly connected together at a joint area formed by said connected rails, said frame further comprising a generally flat facing element having a facing side and further having locking means on the side thereof opposite said facing side; means defining a groove on one of said rails in said joint area and on said facing side of said frame, in which groove said facing element is removably received with the facing side thereof essentially parallel with the facing side of said frame, and recess means in said one rail in said joint area cooperating with said locking means to lock said facing element removably in said groove, said facing element having a size sufficient to cover said joint area fully, and wherein said groove extends in the direction of the longitudinal axis of said one of said rails and has side flanges undercut to define longitudinal recesses of said recess means; said locking means comprise a lateral projection on said facing element engaged in said recess means and at least one lateral resilient finger on said facing element which is snapped by the resiliency thereof into said recess means as said facing element is pressed into said groove.

6. A frame according to claim 3, characterized in that said groove has a bottom surface and said central part of said facing element has a base, and in that said base bears against said bottom surface.

7. A frame suitable for a shower partition having a facing side and being formed of at least two rails angularly connected together at a joint area formed by said connected rails, said frame further comprising a generally flat facing element having a facing side and further having locking means on the side thereof opposite said facing side; means defining a groove on one of said rails in said joint area and on said facing side of said frame, in which groove said facing element is removably received with the facing side thereof essentially parallel with the facing side of said frame, and recess means in said one rail in said joint area cooperating with said locking means to lock said facing element removably in said groove, said facing element having a size sufficient to cover said joint area fully, said groove extending in the direction of the longitudinal axis of said one of said rails and having side flanges defining opposed lateral confining faces parallel to said longitudinal axis, and said facing element having a pair of parallel guide surfaces bearing against said confining faces, said facing element being formed with a part projecting laterally from one of said guiding surfaces, and said laterally projecting part having a length sufficient to overlap the front terminal edge of the other of said rails adjacent said joint area.

8. A frame as claimed in claim 7, characterized in that said laterally projecting part has a thickness in the range of 1 to 4 mm.

9. A frame as claimed in claim 7, characterized in that said laterally projecting part has a thickness in the range of 1.5 to 3 mm.

10. A frame suitable for a shower partition having a facing side and being formed of at least two rails angularly connected together at a joint area formed by said connected rails, said frame further comprising a generally flat facing element having a facing side and further having locking means on the side thereof opposite said facing side, means defining a groove on one of said rails in said joint area and on said facing side of said frame, in which groove said facing element is removably received with the facing side thereof essentially parallel with the facing side of said frame, and recess means in said one rail in said joint area cooperating with said locking means to lock said facing element removably in said groove, said facing element having a size sufficient to cover said joint area fully, said groove extending in the direction of the longitudinal axis of said one of said rails and having side flanges that define opposed lateral confining faces parallel to said longitudinal axis, and said facing element having a pair of parallel guide surfaces bearing against said confining faces, said guide surfaces being formed on the side edges of a central part of said facing element, and wherein said groove is formed at the end of said one of said rails and said central part of said facing element has a length sufficient to overlap slightly said one of said rails beyond said groove.

11. A frame suitable for a shower partition, having a facing side and being formed of at least two rails angularly connected together at a joint area formed by said connected rails, said frame further comprising a generally flat facing element having a facing side and further having locking means on the side thereof opposite said facing side; means defining a groove on one of said rails in said joint area and on said facing side of said frame, in which groove said facing element is removably received with the facing side thereof essentially parallel with the facing side of said frame, and recess means in said joint area cooperating with said locking means to lock said facing element removably in said groove, said facing element having a size sufficient to cover said joint area fully, said groove extending in the direction of the longitudinal axis of said one of said rails and having side flanges that define opposed lateral confining faces parallel to said longitudinal axis, said facing element having a pair of parallel guide surfaces bearing against said confining faces, and said locking means comprising a stud projecting from said facing panel and having fingers resiliently extending outwardly and angularly from the tip of said stud, said stud passing through a hole in the bottom of said groove, the diameter of said hole being smaller than the cross-sectional width at the end of said fingers in released condition thereof.

12. A frame as claimed in claim 5, characterized in that said facing panel has a locating stud projecting therefrom and extending into a hole through the bottom of said groove to accurately position said facing panel in said joint area.

13. A frame as claimed in claim 5, characterized in that said at least one resilient finger laterally projects from the free end of a lever extending from said facing element in the direction of said longitudinal axis.

14. A frame as claimed in claim 13, characterized in that said facing panel has a locating stud projecting therefrom and extending into a hole through the bottom of said groove to accurately position said facing panel in said joint area.

15. A frame as claimed in claim 2, characterized in that said locking means comprise a resilient tongue fixed at one end on the side of said facing element opposite the facing side thereof, said tongue extending in the direction of said longitudinal axis and having a locating stud projecting from the free end thereof, said locating stud being resilintly engaged in a hole through the bottom of said groove.

16. A frame as claimed in claim 15, characterized in that said side flanges are undercut to define longitudinal recesses, and in that said locking means further comprise a rigid lateral projection on said facing element engaged into one of said recesses and a resilient lateral projection on said facing element snapped by the resiliency thereof into the other of said recesses as said facing element is pressed into said groove.

17. A frame as claimed in claim 5, characterized in that said groove extends in the direction of the longitudinal axis of said one of said rails and has side flanges undercut to define longitudinal recesses, in that said locking means comprise at least one rib extending in the direction of said longitudinal axis, said rib being outwardly curved with respect to said axis and undercut along a portion thereof to form resilient locking fingers snappingly engaged in one of said recesses.

18. A frame as claimed in claim 17, characterized in that two ribs and two resilient locking fingers are provided about mid-length of said ribs, each finger being snappingly engaged in one of said recesses.

19. A frame as claimed in claim 18, characterized in that said resilient fingers are rounded off at the edges thereof to facilitate entry into said recesses.

20. A frame as claimed in claim 17, characterized in that said resilient lateral projection is rounded off at the edge thereof to facilitate entry into said other recess.

21. A frame as claimed in claim 5, characterized in that said resilient finger is rounded off at the edge thereof to facilitate entry into said other recess.

22. A frame suitable for a shower partition, having a facing side and being formed of at least two rails angularly connected together at a joint area formed by said connected rails, said frame further comprising a generally flat facing element having a facing side and further having locking means on the side thereof opposite said facing side; means defining a groove on one of said rails in said joint area and on said facing side of said frame, in which groove said facing element is removably received with the facing side thereof essentially parallel with the facing side of said frame, and recess means in said joint area cooperating with said locking means to lock said facing element removably in said groove, said facing element having a size sufficient to cover said joint area fully, and wherein said groove is formed at the end of said one of said rails and said facing element has a length sufficient to overlap slightly said one of said rails beyond said groove.

23. A frame as claimed in claim 22, characterized in that said facing element is formed with a laterally projecting part having a length sufficient to overlap the front terminal edge of the other of said rails adjacent said joint area.

* * * * *